United States Patent [19]

Gore et al.

[11] Patent Number: 5,598,964
[45] Date of Patent: Feb. 4, 1997

[54] APPARATUS FOR ULTRASONIC WELDING OF BATTERY ASSEMBLIES

[75] Inventors: Kiron Gore, Libertyville; Sang Oh, Schaumburg, both of Ill.

[73] Assignee: Motorola, Inc., Schaumburg, Ill.

[21] Appl. No.: 536,558

[22] Filed: Sep. 29, 1995

[51] Int. Cl.⁶ .................................................. B23K 20/10
[52] U.S. Cl. .................. 228/1.1; 156/580.2; 29/623.2
[58] Field of Search ........................ 228/1.1, 44.3, 228/110.1; 156/73.1, 580.1, 580.2; 29/623.2, 623.4; 429/139

[56] References Cited

U.S. PATENT DOCUMENTS

| | | | |
|---|---|---|---|
| 4,410,383 | 10/1983 | Lipari | 156/73.1 |
| 4,931,114 | 6/1990 | Sliva | 156/73.1 |
| 5,372,294 | 12/1994 | Gore et al. | 228/105 |

*Primary Examiner*—Samuel M. Heinrich
*Attorney, Agent, or Firm*—Scott M. Garrett; Kenneth M. Massaroni

[57] ABSTRACT

An unwelded battery assembly (32) is fed to a shuttle (36) which moves the unwelded battery assembly (32) to a moveable platform (46) in a raised position. The platform lowers the battery assembly into a nest (44) which rigidly supports the battery assembly. An ultrasonic horn is lowered into contact with the battery assembly and welds the battery cover (16) to the battery housing (14). The welded battery assembly (57) is then raised out of the nest by the moveable platform (46), and is moved to a second stage (48) while another unwelded battery assembly is shuttled to the platform. A central control circuit (49) operates and synchronizes the apparatus.

11 Claims, 5 Drawing Sheets

APPARATUS FOR ULTRASONIC WELDING OF BATTERY ASSEMBLIES

TECHNICAL FIELD

This invention relates in general to automated assembly apparatus, and particularly to apparatus used in the assembly of battery packs.

BACKGROUND

Often in the manufacture of electrical devices and components ultrasonic welding operations are performed to join sections of a given device's casing. Ultrasonic welding is a well known technique for joining materials such as plastic, which are often used as a casing materials. In a typical device, the casing consists of a housing and a cover. The housing comprises a majority of the casing, and has an opening to allow the various components of the device assembly to be placed in the housing. The cover is typically a flat piece that fits over the opening, and has features which engage corresponding structure around the edge of the opening. These structures are commonly referred to as energy directors, and are melted together upon application of ultrasonic vibrations.

To apply the ultrasonic energy, the housing must be rigidly held while an ultrasonic horn pushes the cover against the housing, and then vibrates the cover. The resulting vibrations between the cover and housing produces friction, which in turn heats and melts the parts together. If the pressure applied by the horn is not uniform, when the material melts, it is possible that some of the melted material may be forced out between the two pieces. This ejected material is referred to as flashing, and is normally considered a defect.

Since the pressure exerted by the horn must be uniform to minimize the occurrence of flashing, the nest used to support the housing must be correctly aligned. However, even if the level of the nest is optimized, the errors in housing position due to hand operations still results in occasional flashing defects. Due to the sensitivity of alignment, operators are limited in the speed with which the equipment may operate without excessive defect rates. To increase production volume, a manufacturer must add welding stations to allow enough time for operators to carefully align the assemblies in the nest.

In high volume manufacturing the cost of additional equipment and labor can be prohibitive, and affects the manufacturers ability to bring the product to market at a competitive price. Therefore there exists a need to eliminate defects induced by hand placing parts for ultra-sonic welding operations, and further there exists a need to increase the speed at which ultrasonic welding operations can be commenced.

DETAILED DESCRIPTION OF THE PREFERRED EMBODIMENT

Figure 1:
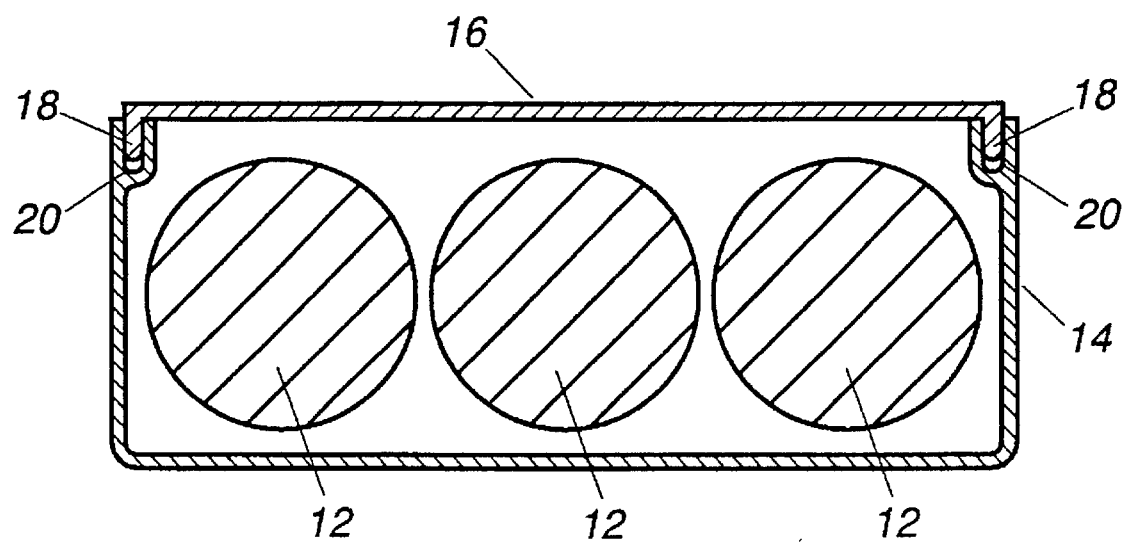
FIG. 1 is a side cut away view of a battery assembly in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a side cut away view of a battery assembly 10 in accordance with the invention. The assembly comprises at least one battery cell 12, a battery housing 14, and a battery cover 16 disposed atop the battery housing. The housing and cover are made of an ultrasonically weldable material such as, for example, plastic. The cover has a ridge 18 which extends substantially around the perimeter of the cover, and corresponds with a grove 20 formed along the edge of the housing. The battery assembly illustrated here is an unwelded assembly. After application of ultrasonic weld energy, the ridge 18 and grove 20 melt together, thereby joining the cover to the housing.

Figure 2:
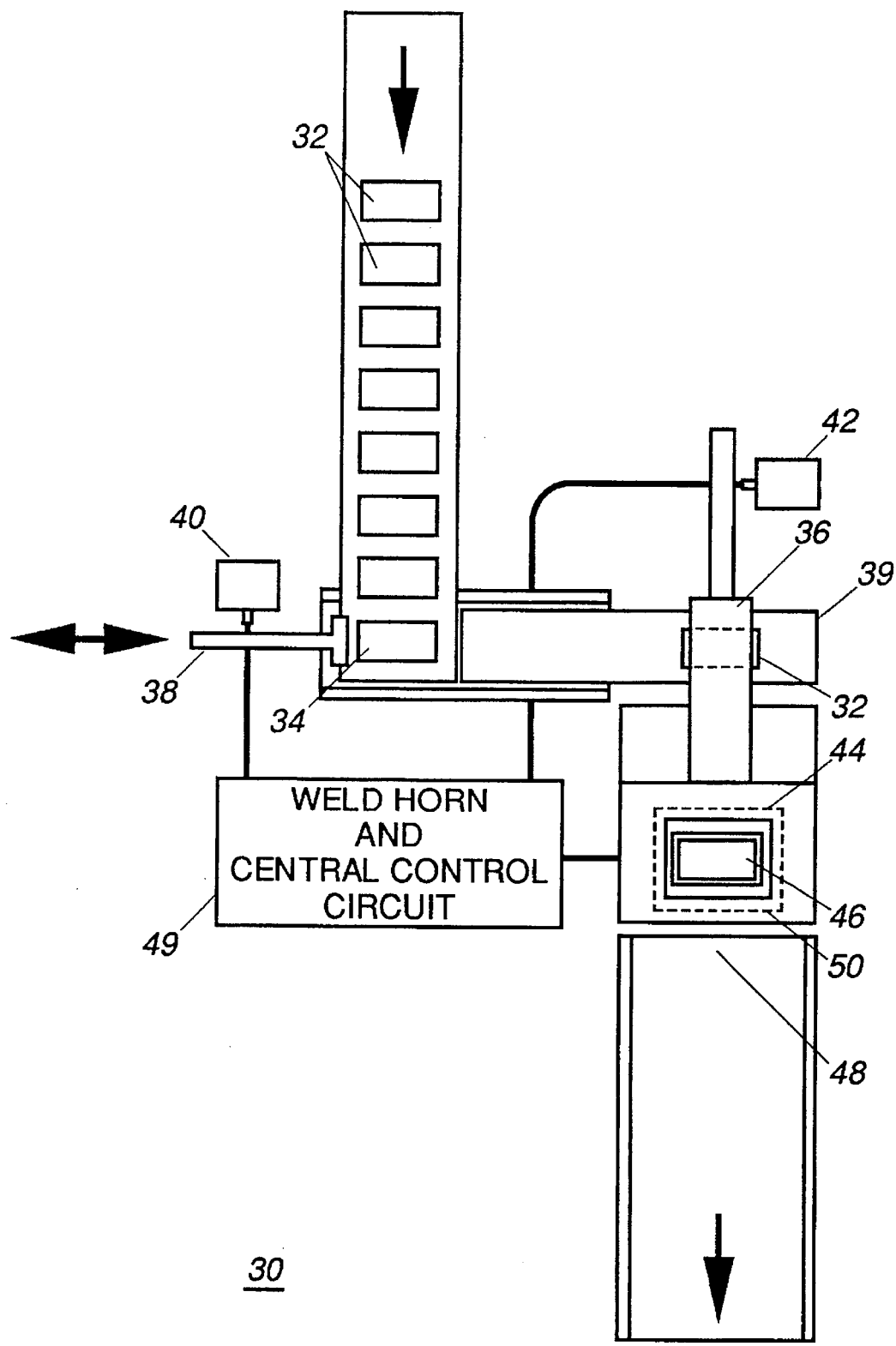
FIG. 2 is a top plan view of an apparatus for automated ultrasonic welding of battery assemblies in accordance with the invention.

Referring now to FIG. 2, there is illustrated therein a top plan view of an apparatus 30 for automated ultrasonic welding of battery assemblies in accordance with the invention. A plurality of unwelded battery assemblies 32 are disposed on, for example, an input conveyor 34. Each battery assembly is fed to a shuttle 36 in a first position, either by hand or by a gating system 38 from a first stage 39 which may comprise an input conveyor. The gating system 38 pushes each unwelded battery assembly from the input conveyor to the shuttle, and is controlled by a motor or air cylinder 40. The shuttle is also controlled by a motor or air cylinder 42, and moves an unwelded battery assembly into a nest 44 by moving to a second position, where the unwelded battery assembly is initially supported by a moveable platform 46 in a raised position. The moveable platform lowers the unwelded battery assembly into the nest where it is rigidly supported. The nest is disposed beneath a moveable ultrasonic horn 50 (shown in phantom), such that the horn and battery assembly correspond. Once the moveable platform lowers the battery assembly into the nest, the ultrasonic horn lowers and presses the cover against the housing while applying ultrasonic vibrations. At the same time another unwelded battery assembly is fed to the shuttle at the first stage. The horn stops after a predetermined time period, and the battery assembly becomes a welded battery assembly. Shortly after the horn is raised, the moveable platform is raised, the shuttle moves the next unwelded battery assembly towards the moveable platform, and simultaneously moves the welded battery assembly to a second stage 48, which could be, for example, an output conveyor.

To automate the apparatus a central control circuit 49 is operatively connected to system components, which includes the welding horn, shuttle 36 and the moveable platform 46, and synchronizes and controls the operation and movements of these system components. The central control circuit typically consists of a programmable logic controller that operates solenoid valves and relays. The valves control air cylinders while the relays control motors. Sensors are used to verify event completion, such as when a battery assembly is in position, which helps the controller determine sequence timing.

A better appreciation of the invention should be gained through a discussion of FIGS. 3–8, where there is illustrated therein a side cut away view of an apparatus for automated ultrasonic welding of battery assemblies, and the sequence in which the apparatus is operated. The apparatus illustrated in the sequence is substantially that illustrated in FIG. 2. There is shown commonly in FIGS. 3–8 a shuttle 36, first stage 39, nest 44, moveable platform 46, and an ultrasonic horn 50.

Figure 3:
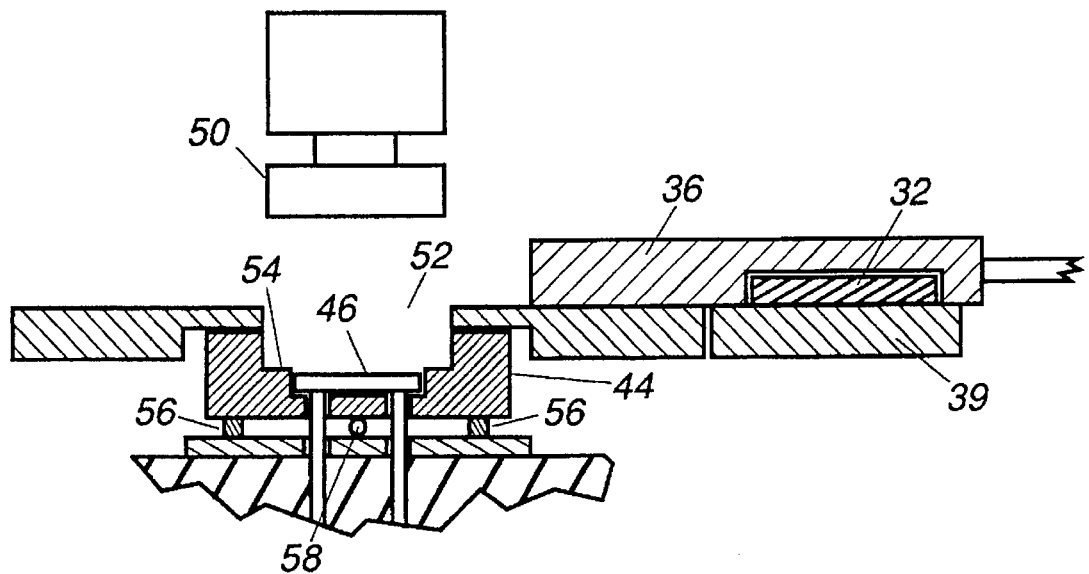
FIGS. 3–8 illustrate a side cut away view of an apparatus for automated ultrasonic welding of battery assemblies and the sequence in which the apparatus is operated.

In FIG. 3 it is shown that the nest 44 comprises a tiered cavity 52 having first and second portions. The first portion is defined by a first tier 54, and is sized and shaped to rigidly support a battery assembly during the welding operation. The second portion of the cavity is where the moveable platform resides when it is in the lowered position. The nest may be a self leveling nest comprising at least three adjustable legs 56, and a self leveling ball mechanism 58. The ball allows the nest to adjust orientation so that pressure from the horn is applied evenly to a battery assembly in the nest. Once a self leveling nest is initially adjusted, the adjustable legs are locked in position so that the nest does not move during welding operations.

Figure 4:
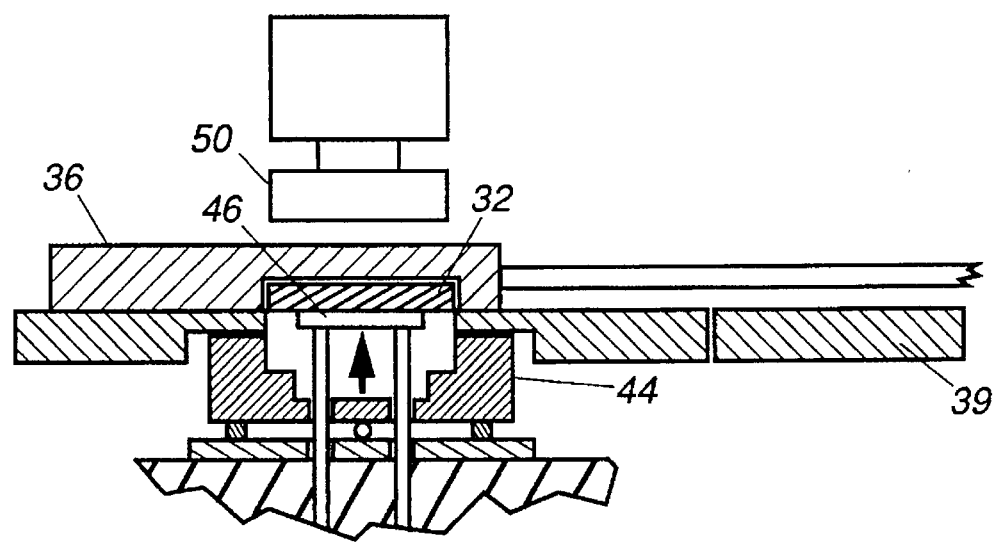
Figure 5:
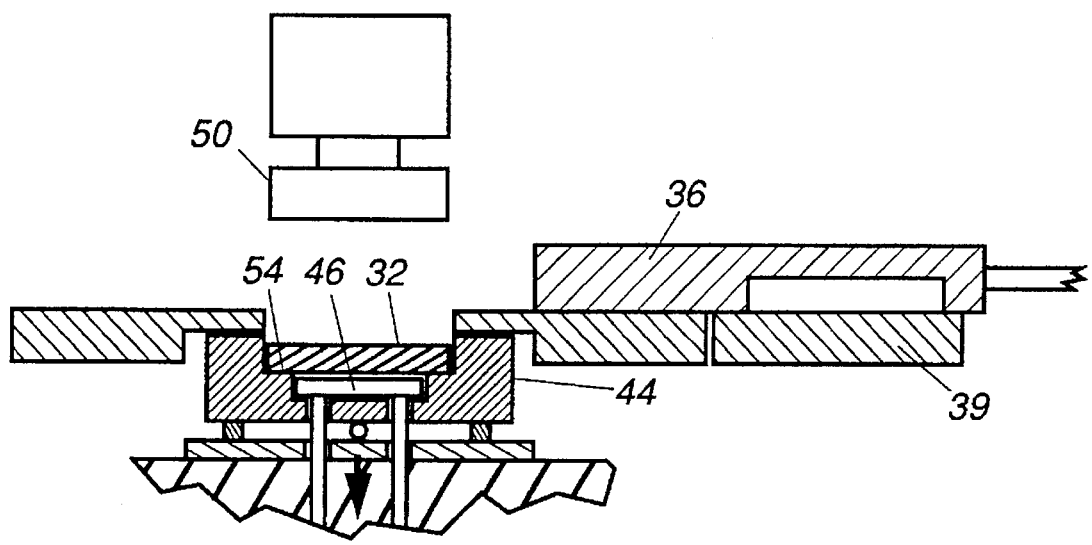
Figure 6:
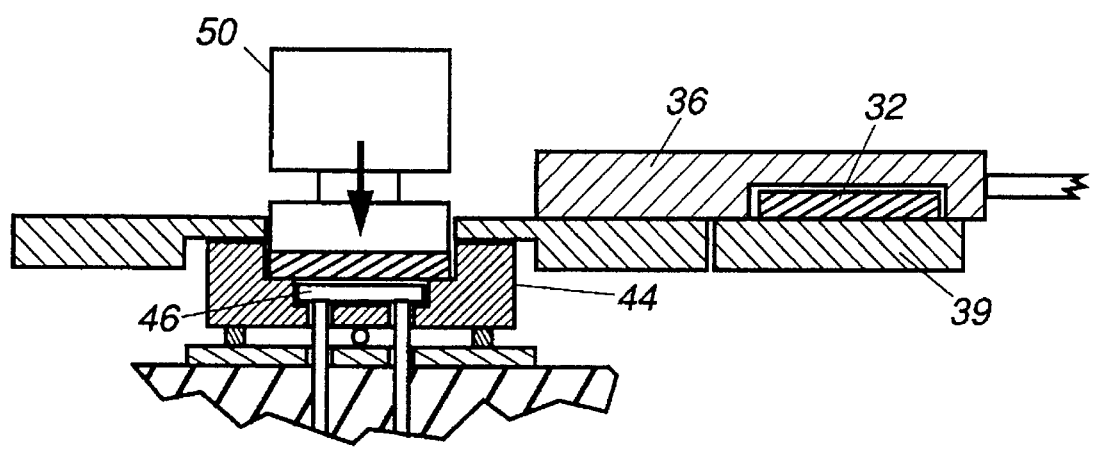
Figure 7:
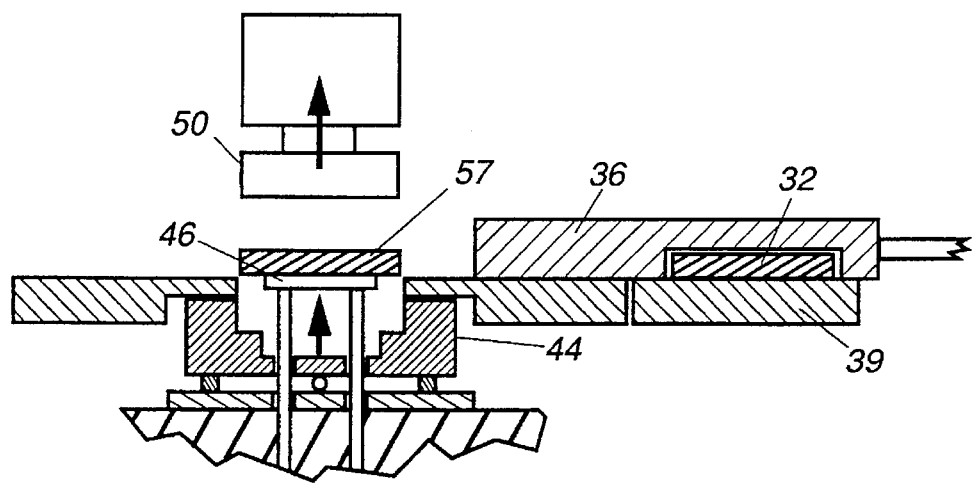
Figure 8:
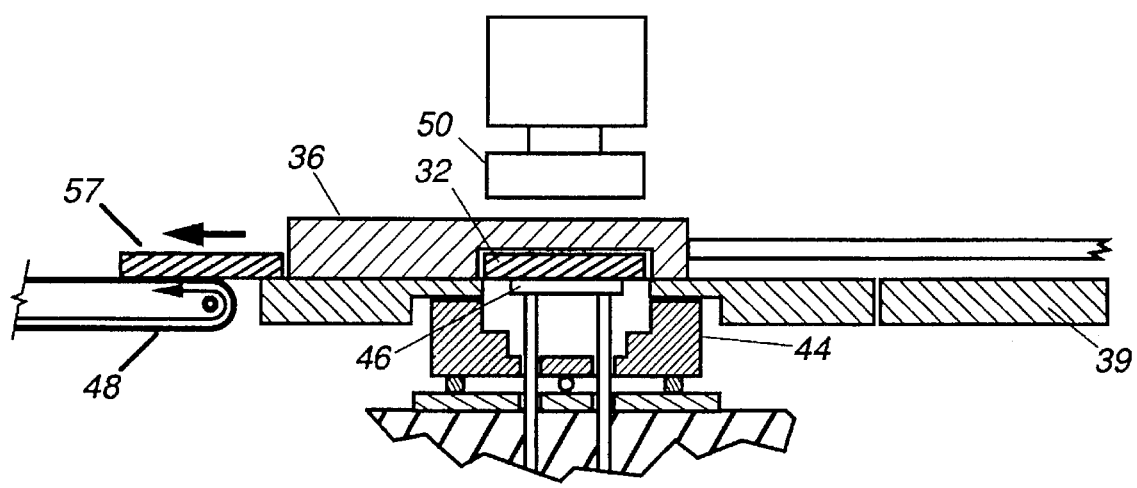

In FIG. 3, there is shown a first step in the sequence, specifically an unwelded battery assembly 32 is located in the shuttle 36 at a first stage 39. The shuttle is at its first position. The moveable platform 46 is in the lowered position and resides in a second portion of a tiered cavity 52 in the nest 44. The ultrasonic horn 50 is in a raised position, and is disposed directly over the tiered cavity 52 in the nest. The nest has been leveled and adjusted for the style of battery assembly. In FIG. 4, the platform 46 has been brought to its raised position, and the shuttle 36 has moved to its second position, thereby moving the unwelded battery assembly on top of the platform. In FIG. 5 the platform 46 has lowered the unwelded battery assembly into the tiered cavity of the nest, and the shuttle 36 has returned to its first position, in that order. The unwelded battery assembly is supported by the first tier 54, and platform resides in the second portion of the cavity. In FIG. 6 the ultrasonic horn 50 is lowered into contact with the unwelded battery assembly and applies ultrasonic vibration to join the cover to the housing. At the same time, another unwelded battery assembly 32 is fed to the shuttle 36. In FIG. 7 the ultrasonic horn 50 is raised, and the platform 46 is brought to its raised position, which lifts the welded battery assembly 57 out of the nest 44. In FIG. 8 the shuttle 36 is moved from its first position to its second position which simultaneously moves the next unwelded battery assembly 32 onto the platform 46, and moves welded battery assembly 57 to a second stage 48.

A significant benefit of the instant invention, if used in conjunction with a self-leveling type nest, is that the operation of the platform is independent of the orientation of the self-leveling nest. Since the self-leveling nest is adjustable to orient the battery assembly for optimum weld performance, it may deviate from horizontal by as much as 15 degrees. However, the vertical movement of the platform is not at all affected such deviations. When a battery assembly is lowered into the self-leveling nest, one side of the battery assembly will contact the self-leveling nest first. As the platform continues to lower, the battery assembly self orients. As the platform is raised to move the welded battery assembly from the self-leveling nest, it contacts the lowest portion of the battery assembly first, and pushes that portion from the self-leveling nest first. As the platform continues to move up, battery assembly orients back to horizontal, or the orientation of the platform, which is substantially horizontal. The surface of the platform should provide enough friction with the battery assembly to keep it from sliding under its own weight, but not enough to interfere with the operation of the shuttle.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An apparatus for automated ultrasonic welding of a plurality of battery assemblies, wherein each said battery assembly has a battery cover disposed atop a battery housing, said apparatus comprising:

a moveable ultrasonic welding horn;

a nest, disposed beneath said welding horn, for holding a first battery assembly, said nest having a tiered cavity having first and second portions, said first portion sized and shaped to rigidly support said first battery assembly;

a moveable platform for moving a battery assembly vertically between a raised position and said first portion of said tiered cavity, said platform residing in said second portion of said tiered cavity; and a shuttle for moving an unwelded battery assembly horizontally from a first stage to said platform when said platform is in a raised position, and for simultaneously moving a welded battery assembly from said moveable platform to a second stage.

2. An apparatus as defined in claim 1, wherein said nest is a self-leveling nest.

3. An apparatus as defined in claim 1, wherein said first stage comprises an input conveyor.

4. An apparatus as defined in claim 1, wherein said second stage is an output conveyor.

5. An apparatus as defined in claim 1, further comprising a gating system for feeding a battery assembly from said first stage to said shuttle.

6. An apparatus as defined in claim 1, further comprising a central control circuit operatively connected to the system components of said welding horn, said shuttle and said moveable platform for synchronizing and controlling the operation and movements of said system components.

7. An apparatus for automated ultrasonic welding of a plurality of battery assemblies, wherein each said battery assembly has a battery cover disposed atop a battery housing, said apparatus comprising:

a moveable ultrasonic welding horn;

a nest, disposed beneath said welding horn, for holding a first battery assembly, said nest having a cavity having first and second portions, said first portion sized and shaped to rigidly support said first battery assembly;

a moveable platform for moving a battery assembly vertically between a raised position and said first portion of said cavity, said platform residing in said second portion of said cavity;

a shuttle for moving an unwelded battery assembly horizontally from a first stage to said platform when said platform is in a raised position, and for simultaneously moving a welded battery assembly from said platform to a second stage; and a central control circuit operatively connected to the system components of said welding horn, said shuttle and said moveable platform for synchronizing and controlling the operation of said system components.

8. An apparatus as defined in claim 7, wherein said nest is a self-leveling nest.

9. An apparatus as defined in claim 7, wherein said first stage is an input conveyor.

10. An apparatus as defined in claim 7, wherein said second stage is an output conveyor.

11. An apparatus as defined in claim 7, further comprising a gating system for feeding a battery assembly from said first stage to said shuttle.

* * * * *